(12) United States Patent
Ouedraogo et al.

(10) Patent No.: US 10,554,524 B2
(45) Date of Patent: Feb. 4, 2020

(54) ESTIMATION OF NETWORK CONDITIONS OF INDIVIDUAL PATHS IN A MULTI-PATH CONNECTION INVOLVING A DEVICE NOT AWARE OF MULTI-PATH SIGNALING

(71) Applicant: CANON KABUSHIKI KAISHA, Tokyo (JP)

(72) Inventors: Naël Ouedraogo, Maure de Bretagne (FR); Frédéric Maze, Langan (FR); Jonathan Taquet, Talensac (FR)

(73) Assignee: Canon Kabushiki Kaisha, Tokyo (JP)

( * ) Notice: Subject to any disclaimer, the term of this patent is extended or adjusted under 35 U.S.C. 154(b) by 646 days.

(21) Appl. No.: 15/336,539

(22) Filed: Oct. 27, 2016

(65) Prior Publication Data

US 2017/0126527 A1 May 4, 2017

(30) Foreign Application Priority Data

Oct. 30, 2015 (GB) .................................. 1519268.5

(51) Int. Cl.
*G06F 15/173* (2006.01)
*H04L 12/26* (2006.01)
*H04L 29/06* (2006.01)

(52) U.S. Cl.
CPC .......... *H04L 43/0864* (2013.01); *H04L 65/80* (2013.01); *H04L 67/42* (2013.01); *H04L 43/16* (2013.01)

(58) Field of Classification Search
CPC . H04L 41/5009; H04L 41/5051; H04L 27/01; H04L 27/2636; H04L 45/24; H04L 69/14; H04L 47/11
USPC ......................................... 709/223, 224, 228
See application file for complete search history.

(56) References Cited

U.S. PATENT DOCUMENTS

2009/0086645 A1 4/2009 Hedayat et al.
2014/0258524 A1 9/2014 Thyni et al.

*Primary Examiner* — Lan Dai T Truong
(74) *Attorney, Agent, or Firm* — Canon U.S.A., Inc. IP Division

(57) ABSTRACT

A method for estimating network conditions of a multi-path connection between a server and a client that is not aware of multi-path signalling. The server having a plurality of communication interfaces connected to a same communication interface of the client through a respective plurality of paths, the method begins, at the server, by obtaining at least one parameter characterizing the client, determining, based on the at least one obtained parameter, an order for successively considering each path of two or more paths. The method may continue for each path successively considered, sending data over at least the path considered, and receiving, over a reception path, at least one feedback message, in response to the sent data and determining network conditions of the two or more paths, using the received feedback messages.

20 Claims, 8 Drawing Sheets

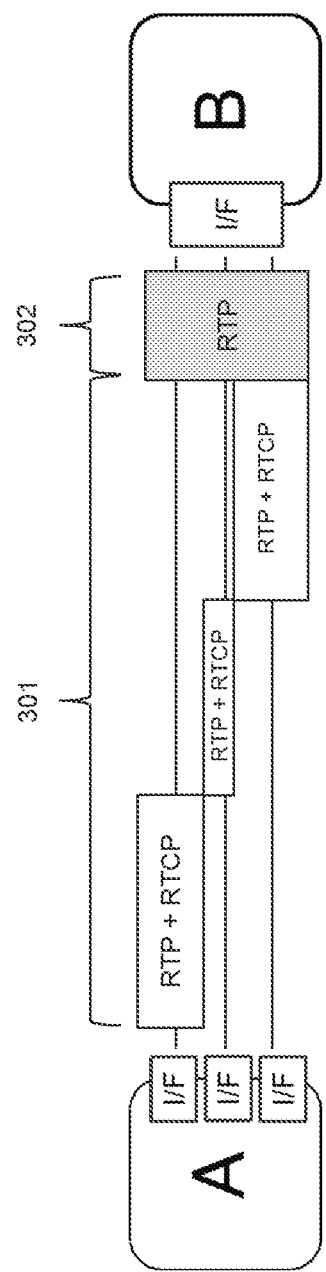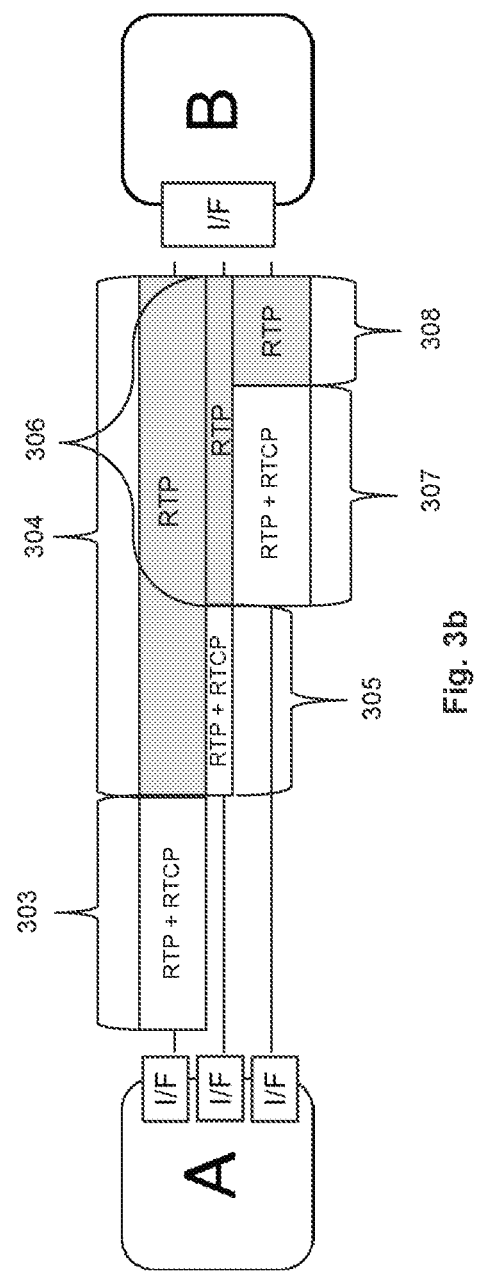
Fig. 3a
Fig. 3b

ESTIMATION OF NETWORK CONDITIONS OF INDIVIDUAL PATHS IN A MULTI-PATH CONNECTION INVOLVING A DEVICE NOT AWARE OF MULTI-PATH SIGNALING

CROSS REFERENCE TO RELATED APPLICATIONS

This application claims the benefit under 35 U.S.C. § 119(a)-(d) of United Kingdom Patent Application No. 1519268.5 filed on Oct. 30, 2015 and entitled "ESTIMATION OF NETWORK CONDITIONS OF INDIVIDUAL PATHS IN A MULTI-PATH CONNECTION INVOLVING A DEVICE NOT AWARE OF MULTI-PATH SIGNALING". The above cited patent application is incorporated herein by reference in its entirety.

FIELD OF THE INVENTION

The present invention relates in general to the management of transmission using feedback messages in multi-path communication networks. In particular, the present invention has applications in the management of control message transmission from a server over a multi-path connection between the server and a client not aware of multi-path signaling, during a multi-path RTP (Real Time Protocol) session.

BACKGROUND OF THE INVENTION

Classically, a media stream may be sent over communication networks using different transmission protocols. For instance, the User Datagram Protocol (hereafter UDP) uses a simple transmission model with a minimum of protocol mechanism so that media data are provided quickly. This is because UDP does not require prior communications ("handshaking dialogues") to set up special transmission channels or data paths prior to sending data packets. However, UDP does not ensure that packets are well received and that they are received in the right order, and only once each (i.e. there are no duplicate thereof). Indeed, packets are sent individually and are checked for integrity only if they arrive.

The Real Time Protocol (hereafter RTP), which is based on UDP, is more adapted to video and audio streaming between a server and a client device, over the communication network. According to RTP, payload data are provided with an additional header including an identifier of the data source, a timestamp for synchronization, sequence numbers for managing packet loss and reordering, and a payload type specifying the type (audio/video) and the format (codec) of the transported media.

In order to handle the transmission of packets, RTP also defines the Real Time Control Protocol (hereafter RTCP). RTCP messages are defined for exchanging control messages with different purposes such as monitoring of transmission, correction of transmission errors, and control of the codec.

For instance, Receiver Report (RR) and Sender Report (SR) are RTCP messages sent for estimating the network conditions (e.g. network jitter, loss rate, round trip time (RTT)). Negative Acknowledgment (NACK) messages are for requesting the retransmission of non-received packets. Slice Loss Indication (SLI) and Picture Loss Indication (PLI) are for indicating a loss of a specific part of a video sequence. A Full Intra Request (FIR) is for requiring the encoder to encode a full intra picture in order to limit error propagation in a video sequence and a Temporary Maximum Media Stream Bit Rate Request (TMMBR) is for indicating a bit rate limit to be respected by the encoder. Depending on the events observed during the transmission, an application managing the RTP media session generates adapted RTCP messages.

In the context of video (and audio) streaming, communication devices having several network interfaces are preferably used so that they can perform multi-path streaming (MP-RTP for multi-path RTP). Given the important amount of data to be transmitted over the network, it is particularly advantageous to allow packets (media data or RTCP message(s)) to be sent in parallel over several paths forming several subflows. In the following description, a path is defined as a communication link set between a network interface of a communication device (e.g. server) and another network interface of another communication device (e.g. client).

In general terms, each path between one of the communication interfaces of the server and the communication interface of the client has specific characteristics (bandwidth, latency, jitter, etc.) that are generally different from the characteristics of another path between another communication interface of the server and the communication interface of the client. Also, delivery requirements (transmission requirements) are different depending on the type of packets or messages exchanged. For instance, in terms of bandwidth, the RTCP stream bitrate must be bounded at 5% of the media stream (RTP) path bandwidth. This bitrate has to be shared among the different paths of the multi-path.

In order to achieve an efficient transmission over these different paths depending on their own characteristics, MP-RTP standard, as standardized by the IETF (acronym for Internet Engineering Task Force), provides means for controlling the streaming on each path based on the exchange of specific RTCP messages called multi-path RTCP feedback messages (MP-RTCP) and by adding an extension header into the RTP header containing a path identifier and a sequence number dedicated to a path. An MP-RTCP feedback message aggregates data regarding the performance of each path of the multi-path, and thus allows the server to determine the relative performance (network conditions) of each path. Based on the determined performances, the traffic on each path of the multi-path may be balanced as appropriate (this is called load balancing).

An MP-RTP communication may occur in environment composed of heterogeneous networks, for instance between communication devices having a different number of communication interfaces connected to different types of networks such as wired networks, wireless or mobile networks (e.g. Wi-Fi, 3G/4G). The present invention lies in this context. More specifically, a server-client implementation is considered, with a server able to communicate using a plurality of communication interfaces in parallel while the client (called legacy RTP client) is not aware of multi-path signaling.

An issue is that a legacy RTP client is not compliant with MP-RTP, meaning that it is not aware of multi-path related fields of MP-RTP packets and MP-RTCP messages. Therefore, the specific MP-RTCP messages sent to control each path during the streaming are ignored by the legacy client. Furthermore, no MP-RTCP feedback messages are transmitted to the server whereas these messages are important to control streaming over the different paths of the multi-path RTP session as mentioned. In order to get feedback messages from the legacy client, the server must thus transmit RTCP messages focusing on the whole multi-path RTP session rather than MP-RTCP messages. Thus the server is unable to obtain efficiently network conditions or parameters of each individual path.

Another issue is that when receiving a message (RTCP or data (RTP)) over a given path, the legacy client may transmit a feedback message over anyone of the paths, including on a different path. This may skew network conditions estimations by the server. For instance, when receiving an SR message, the legacy client may respond by transmitting an RR message on the same path or on another path. In the last case, the RTT calculation may be biased since this duration depends on the quality of the path on which the SR has been transmitted but also on the quality of the path on which the RR has been transmitted.

This shows that determining the network conditions of each individual path in case a legacy client is involved is not simple.

Therefore, there is a need for a method of efficiently estimating the network conditions of a multi-path connection between a server and a client not aware of multi-path signaling.

SUMMARY OF THE INVENTION

The present invention has been devised to address one or more of the foregoing concerns.

In this context, according to a first aspect of the invention, there is provided a method of estimating network conditions of a multi-path connection between a server and a client not aware of multi-path signaling, the server having a plurality of communication interfaces connected to a same communication interface of the client through a respective plurality of paths, the method comprising, at the server:

obtaining at least one parameter characterizing the client;

determining, based on the at least one obtained parameter, an order for successively considering each path of two or more paths;

for each path successively considered, sending data over at least the path considered, and receiving, over a reception path, at least one feedback message, in response to the sent data; and determining network conditions of the two or more paths, using the received feedback messages.

Correspondingly, there is provided a server having a plurality of communication interfaces to establish a multi-path communication over a respective plurality of paths, with a same communication interface of a client not aware of multi-path signaling, the server comprising at least one microprocessor configured for carrying out, in a web run-time environment running in the server, the steps of any method defined above.

There is also provided a communication system for monitoring multi-path transmission of media data comprising such a server and a client not aware of multi-path signaling.

As the client is not aware of multi-path signaling, the client only sends conventional session-based feedback messages in response to received data. To be able to infer network conditions at path level from information retrieved based on conventional session-based feedback messages, it is advantageous to first handle the paths for which network conditions can be quite easily be determined, before handling other paths for which network conditions can only be determined using for instance the network conditions of other paths.

This is why a scheme or pattern defining how the different paths are successively considered has impact on how quickly and precisely the network conditions for the paths are determined. Thus the present invention, by determining the order for successively considering each path, i.e. by determining such scheme or pattern, based on knowledge of the client's behavior (i.e. of the client parameters), improves the determination of network conditions of individual paths in situations where the client is not aware of multi-path signaling.

A consequence is that the improvement in determining the network conditions also improves the determination of a scheduling scheme. Thus, the transmission of data over the paths is optimized.

In addition, the scheduling scheme obtained may also provide an efficient scheduling of the sending of feedback request messages such that the client responds to a greater number of feedback request messages. As a consequence, the multi-path monitoring is also improved.

In that way, the risk of obtaining skew network conditions estimations based on these feedback messages is thus decreased.

Optional features of the invention are further defined in the dependent appended claims.

In embodiments, network conditions of a given path are inferred from network conditions of another path. As no multi-path signaling can be used, the information deduced from session-based feedback messages may relate to two or more paths. Determination of the network conditions for a path may thus depend from those of another path.

In other embodiments, wherein network conditions of the considered path are determined based only on the feedback messages received in response to data sent over the considered path and/or determined network conditions of at least one already considered path. Thus the determination of the network conditions is progressive over the individual paths. For instance this makes it possible to fully and efficiently use the paths already processed as early as possible to send data.

In yet other embodiments, a plurality of feedback response messages are received over the reception path for the considered path, and determining network conditions comprises:

estimating, for each received feedback response message, a set of network conditions of the considered path; and determining network stability of the considered path based on a variation of its network conditions over the estimated sets.

With knowledge of the stability of each path, a better selection of the paths to use for multi-path communication can be performed.

For instance, the method may further comprise disabling, from use for multi-path transmission of data, a path determined as unstable. This is to decrease risks of having packet losses.

In specific embodiments, the data are sent over the path considered and at least one path already determined as being stable. It means that bandwidth of the stable path (its network conditions having already been determined) is used to send data. Thus, transmission of data (for instance streaming of media data) can start early, while not all the paths have their network conditions determined.

In a variant, the data are sent over the path considered only.

In some embodiments, the at least one parameter characterizing the client comprises a time interval between two feedback request messages to which the client is able to respond with respective feedback messages. Knowledge of the time interval makes it possible to efficiently schedule feedback request messages during the estimation of the path network conditions, so that a maximum number of feedback messages are sent in response by the client. A consequence is that better and quicker estimation of the network conditions is obtained.

In specific embodiments, the time interval is obtained by repetitively sending feedback request messages to the client over a same path with a time interval between two feedback request messages that varies depending on whether a feedback message is received from the client in response to the sent feedback request message or not. This process for determining the time interval is simple to implement with a very fine estimation thereof.

In some embodiments, obtaining the least one parameter characterizing the client comprises selecting the two or more paths from among the plurality of paths, wherein the selecting step comprises:
sending data over each path of the plurality;
determining, for each path, whether a feedback message is received in response to the data sent on this path; and
selecting the paths for which it is determined that a feedback message is received.

This approach makes it possible to restrict the multi-path communication over only the path the client can handle.

In specific embodiments, the method further comprises determining a single path, referred to as preferred path, over which all the feedback response messages are received. Knowledge of the preferred path may become important as shown in exemplary embodiments described below. As the client always responds on this path, its network conditions may be estimated first because they do not depend on other paths.

In some embodiments, obtaining the least one parameter characterizing the client comprises:
sending data over a sending path;
receiving, over a receiving path, at least one feedback message, in response to the sent data;
associating in memory the sending path with the receiving path.

This association information may be helpful to consider the best order to successively consider the path, in such a way the network conditions of a path currently considered only depend on the network conditions of one or more path already considered. A consequence is that the path currently considered become available for efficient transmission of data, as soon as its network conditions have been determined, i.e. quite early.

In some embodiments, the network conditions of a given path comprise at least one of the following parameters: bandwidth available on the given path, Round Trip Time value on the given path, jitter on the given path and loss rate on the given path. For instance, a Round Trip Time value on a given path is inferred from a Round Trip Time value of the preferred path.

In some embodiments, the determined network conditions of one path comprise a Round Trip Time value of the path.

In some embodiments, the method comprises a preliminary step of detecting that the client is not aware of multi-path signaling.

In some embodiments, the two or more paths comprise the plurality of paths. It means that the network conditions of all the paths are determined.

The network conditions determined using any embodiment as above can be used to transmit data to the client, e.g. to stream media data.

In this context, there is provided a method of transmitting data over a multi-path connection between a server and a client not aware of multi-path signaling, the server having a plurality of communication interfaces connected to a same communication interface of the client through a respective plurality of paths, the method comprising, at the server:
estimating network conditions of two or more paths using any method as defined above;
determining, based on the estimated network conditions, a scheduling scheme for transmitting data over the two or more paths; and
transmitting, according to the scheduling scheme, data over the two or more paths.

As network conditions have been determined for individual paths, a better scheduling scheme for data transmission is obtained, i.e. with an improved used of the bandwidth and an improved repartition of the media data and the control messages over the paths of the multi-path communication.

In embodiments, the method further comprises a monitoring step comprising:
based on any feedback message received in response to the transmitted data, estimating new network conditions of the two or more paths; and
comparing, for at least one path, its new network conditions to its determined network conditions.

Thanks to the more efficient scheduling schemes, such a monitoring step is proved to be more effective. A better detection of network condition changes can thus be obtained.

In specific embodiments, the method further comprises, if a variation between the new network conditions and the determined network conditions of one path exceeds a predefined threshold, estimating new network conditions of at least the path using any network condition estimation method as defined above. This ensures the scheduling scheme for next transmission can be finely adapted to the network changes.

According to a specific feature, the method further comprises, if the variations for all the two or more paths do not exceed the predefined threshold for at least a predefined duration, increasing a time interval between the sending of two feedback request messages by the server. Thus less feedback request messages are sent, thereby freeing some bandwidth to transmit media data on the paths.

In some embodiments, the monitoring step comprises sending feedback request messages over a preferred path more often than over another path, and upon receiving each feedback response message in response to the sent feedback request messages, estimating new network conditions of the preferred path based on the received feedback response message. This is because the preferred path may be the starting point for inferring network conditions of the other paths. It is of high importance that the slight variations of the preferred path be detected as early as possible, to keep accurate estimation of network conditions for the other paths.

Another aspect of the invention relates to a non-transitory computer-readable medium storing a program which, when executed by a microprocessor or computer system in a device of a communication network, causes the device to perform any method as defined above.

The non-transitory computer-readable medium may have features and advantages that are analogous to those set out above and below in relation to the method and server.

Another aspect of the invention relates to a method, substantially as herein described with reference to, and as shown in any one of FIGS. 2 to 7 of the accompanying drawings, and a server substantially as herein described with reference to, and as shown in any one of FIGS. 1 and 8 of the accompanying drawings.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIGS. 3a and 3b, illustrate two alternative configuration for sending data when successively estimating network conditions of each individual paths, in embodiments of the method of FIG. 2;

DETAILED DESCRIPTION OF EMBODIMENTS OF THE INVENTION

The invention is now described by means of specific non-limiting exemplary embodiments and by reference to Figures.

Figure 1:
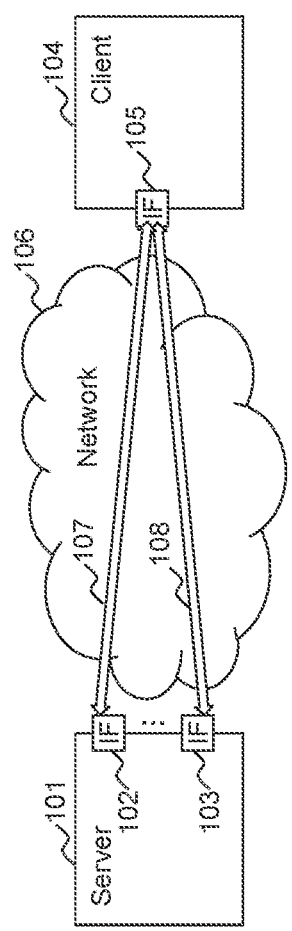
FIG. 1 illustrates an exemplary configuration comprising a server and a client not aware of multi-path signaling, in which a method according to embodiments of the present invention could be implemented.

A general context of implementation of embodiments is illustrated in FIG. 1.

Two devices 101 and 104 exchange data, for example multimedia content, through a network 106. The device 101 is set up with at least two network communication interfaces 102 (IF) and 103 (IF) in order to perform multipath communications with the device 104 which is set up with a single network communication interface 105 (IF).

In variants, the device 104 may have even more network communication interfaces. In any case, it is assumed here that the device 104 is able to handle only one network communication interface at a time, and is not aware of multi path features, in particular cannot understand multi path signaling such as multipath-specific headers or multipath-specific control messages. In contrast, it is assumed that the device 101 is always capable of handling several network communication interfaces in parallel, and thus is aware of multi-path signaling.

In order to make it simple, it is assumed, in what follows, that a device having a single communication interface is to be understood as a device not aware of multi-path signaling, such as MP-RTP headers or MP-RTCP messages, in contrast to a multi-communication-interface device which is able to use several communication interfaces in parallel and thus to handle multi-path signaling.

In FIG. 1, the server 101 has only two communication interfaces 102, 103 connected to the same communication interface 105 of the client 104 through only two respective paths 107 and 108. However, a greater number of communication interfaces at the server, and thus of paths may be used. The invention is not limited to two network connections and paths.

A communication session, such as an RTP session, is established between the two devices 101, 104. The communication session may be bidirectional, i.e., data (for example media data) may be transmitted from device 101 to device 104 and conversely. However, in what follows, only for illustrative purposes, the communication session is considered to be a unidirectional streaming of media data from device 101 to device 104.

In order to control the transmission from device 101, namely the "server", to device 104, namely the "client", control messages (also called feedback request/response messages) may be exchanged.

In what follows, for illustrative purposes, the communication session is considered to be an RTP session, for instance described in a Session Description Protocol (SDP) manifest exchanged at the beginning of the session, usually sent by the server in response to client's request. The control messages are thus embedded into RTCP packets exchanged using the RTCP communication protocol. Also, in what follows, the control messages may be thus designated as RTCP messages.

With a view of improving monitoring of a multi-path (MP) data transmission despite the use of conventional RTCP signaling (and not MP-RTCP due to no awareness of the client), it is proposed to provide a new way to determine network conditions at path level. In this context, the present invention proposes the following steps, at the server:
  obtaining at least one parameter characterizing the client. This is to have knowledge of the client's behavior;
  determining, based on the at least one obtained parameter, an order for successively considering each path of two or more paths;
  for each path successively considered:
    sending data over at least the path considered;
    receiving, over a reception path, at least one feedback message, in response to the sent data;
    determining network conditions of the two or more paths, using the received feedback messages.

Indeed, as the client is not aware of multi-path signaling, the client only sends conventional session-based feedback messages in response to received data. To be able to infer network conditions at path level from information retrieved based on conventional session-based feedback messages, it is advantageous to first handle the paths for which network conditions can be quite easily be determined, before handling other paths for which network conditions can only be determined using for instance the network conditions of other paths.

This is why the scheme or pattern defining how the different paths are successively considered has impact on how quickly and precisely the network conditions for the paths are determined. Determining such scheme or pattern, including the above-mentioned order, based on knowledge of the client's behavior (i.e. of the client parameters) may thus provide good results.

In addition, determining network conditions for the individual paths is important since no value for the network conditions is directly indicated by the client in the conventional session-based feedback response messages. It means that the server needs to cross check the various feedback response messages to deduce some information about the network conditions, such as bandwidth available on a path, Round Trip Time value on a path, jitter on a path and loss rate on a path.

Thanks to the knowledge of network conditions of the paths of the multi-path, it is possible to determine a scheduling scheme for transmitting data over the two or more paths; and then to transmit, according to the scheduling scheme, data over the two or more paths.

Such scheduling scheme defines parameters for transmission over the multi-path, such that the timing to send packets and the path on which they are to be sent. It should preferably seek to use a maximum bandwidth to send streamed media data and to send feedback request messages in such a way that the client receives these messages in the best way, so that it can respond to them. In such a case, an efficient monitoring of the individual paths based on feedback response messages may be arranged.

Figure 2:
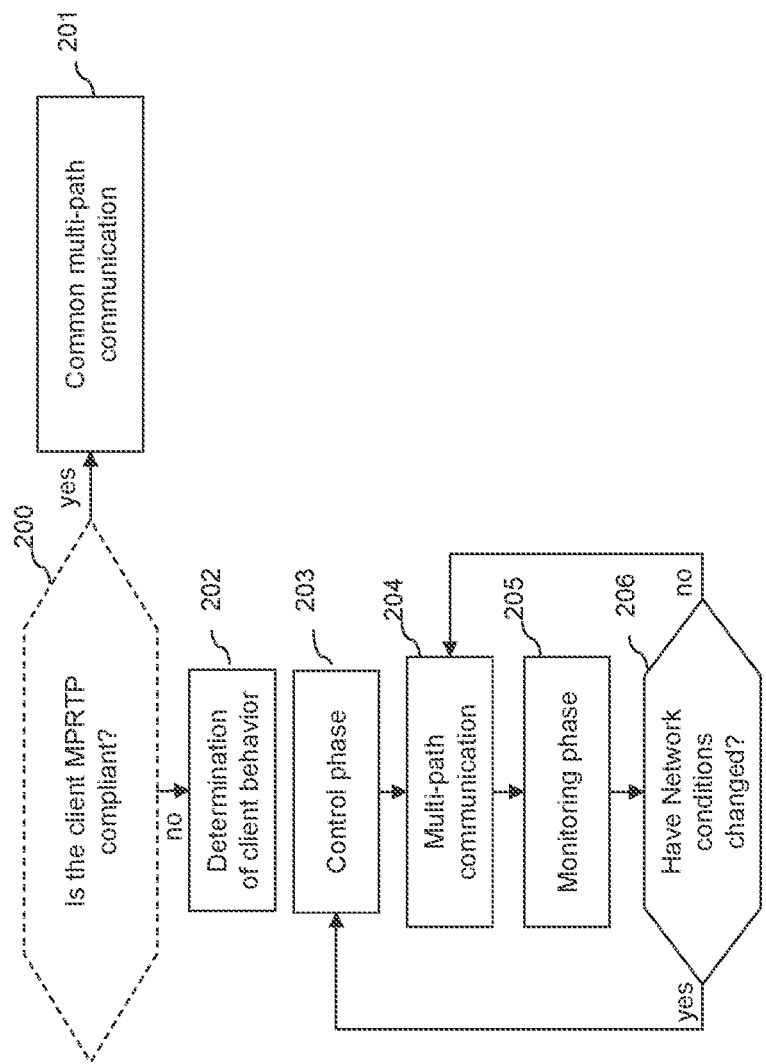
FIG. 2 is a flowchart of steps illustrating general steps of a method according to embodiments of the present invention.

As shown in FIG. 2, that illustrates general steps according to embodiments of the present invention, a preliminary step 200 can be performed, during which the server detects whether the client is able to use only one communication interface at a time or if it may handle several communication interfaces in parallel (as the server). In other words, it is determined if the client supports multi-path (MP) RTP streaming protocol, i.e. multi-path signaling.

In practice, the server may detect multi-path inability of the client based on client's rejection of any SDP sent by the server to declare a multiple network interfaces exchanged with Real Time Streaming Protocol (RTSP) or any other protocol such as Session Initiation Protocol (SIP) negotiation phase, by the client.

Another way to detect MP inability of the client is to transmit an MP-RTCP message to it over a usable path, and to wait for a response. If no response is provided by the client, it may mean that the client is not multi-path-compliant (not MP aware). For instance, if no MP-RTCP Receiver Report is transmitted in response to a MP-RTCP Sender Report transmitted by the server after a predetermined delay, it is considered that the client is not multi-path aware. In such a case, the client is said to be "legacy client".

If the client is a legacy client, it is not configured to handle correctly a multi-path communication protocol, for instance because the device is too old and is not aware of multi-path protocol headers. The transport layer of the client can only interpret data as if they were coming from a unique path. As a consequence, the client is not aware of multi-path RTP extension and thus discards any MP-RTCP message without answering to it.

When, at step 200, it is determined that the client is MP compliant (which is not the case shown in FIG. 1), a multi-path communication 201 is performed, which is conventionally controlled by MP-RTCP messages.

Otherwise, when it is determined that the client is a legacy client such as a legacy client 104 in FIG. 1, a specific process is performed according to the present invention.

This process is for controlling the streaming of media data over the multi-path and aims at managing the simultaneous exchanges of control messages (RTCP feedback messages) between the server and the client in order to allow the measure of network characteristics to be made, such that the bandwidth, the RTT, the jitter, the loss rate, or other network conditions, for individual paths of the multi-path, preferably for each path of the multi-path.

For these purposes, the client's behavior is first estimated (step 202), i.e. it is determined how the client reacts to data sent over multiple paths. Thus, parameters characterizing the client may be obtained by the server.

In a variant to estimating the client's behavior, by-default client parameters may be retrieved from memory by the server, for instance based on a type of client.

In this variant, the behavior of the client may be determined from a set of predefined behaviors known by the server. The client may specify an identifier which makes it possible to identify the index of the behavior of the client's in the list of predefined behaviors. The identifier may be for instance the model and the brand of the client device.

Three main indications characterizing the client may be obtained: a minimum time interval between two successive feedback messages to properly process, the usable paths vs. the unusable paths, and correspondences between two paths linking a sending path on which data are sent by the server and a receiving path on which the feedback messages responding to the data are sent by the client.

For instance, by sending RTCP messages on a given path, the server may determine if the client always responds to the same given path, or if it responds on a particular path (or "preferred path") whatever the given path used to send the RTCP messages, or if it responds to any paths indifferently of the given path used by the server to send the RTCP messages. The server also determines if the client sends RTCP messages in response to RTCP messages sent by the server or following a particular timing independent of messages sent by the server.

These indications should preferably be taken into account, in addition to the determined network conditions, to determine the above-mentioned scheduling scheme for transmitting the data. For instance, the unusable paths should be avoided, while feedback messages should be sent to respect the minimum time interval at the server and/or at reception by the client.

Of all this make that a multi-path communication and its monitoring can be improved.

Conventionally, a fixed interval of time or delay is generally respected between two transmissions of SR messages, and two transmissions of RR messages. In other words, SR messages are transmitted at a given frequency, so as the RR messages. This interval of time or delay depends on the data rate and the number of participants in a RTP session. As a non-limiting example, the standard RFC 3550 recommends using a minimum time interval of 5 seconds between two transmissions of RR or SR messages. But, depending on the client, this minimum RTCP interval may also be scaled to a smaller value inversely proportional to the data rate.

An issue with multi-path is that control messages sent by the server over various paths may take different times to reach the client. A scheduling scheme ensuring to have efficient reception by the client of sent control messages is thus sought. This is why the network conditions of the paths should be efficiently determined and then monitored to put the client in best position to provide a maximum of feedbacks.

It is a particular issue to try to minimize the delay between the transmissions of two SR messages while ensuring that the client will answer to all these SR messages, given that a predetermined transmission delay must be respected by the client between two RR messages transmissions.

An exemplary way of determining a minimum transmission delay is described with reference to FIG. 5.

Also, the paths usable by the client also form a characterization of the client that may be determined. Its knowledge is of important that it also defines the paths usable by the server for multi-path communication.

In practice, it may be checked if the client answers to each SR message transmitted from the server whichever the path used to transmit it. It may be interesting to record the association between the path on which the client answers to the SR message with the path on which the SR has been sent. This recording may help the server to infer how the client is configured in terms of RTCP message management. More details are given with reference to FIG. 4.

Figure 5:
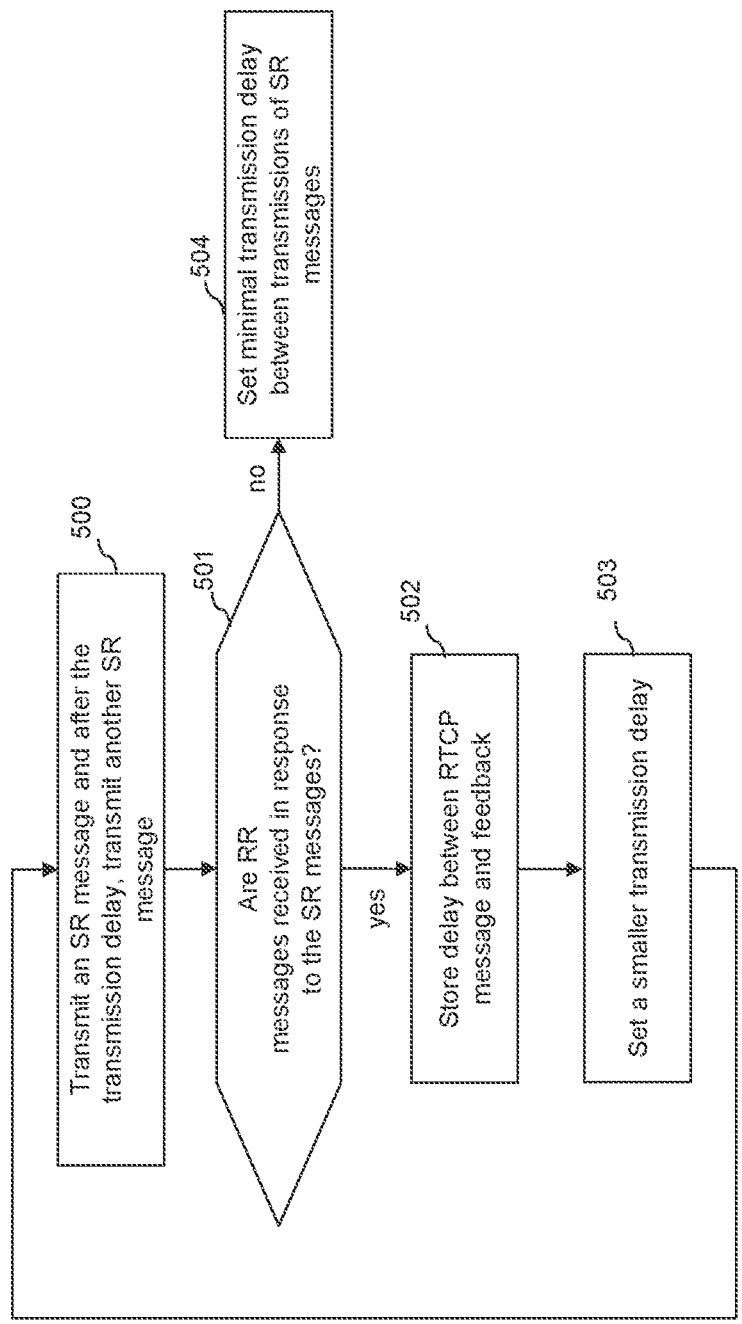

FIG. 5 shows exemplary steps for determining the minimum transmission delay between two transmissions of SR messages (or the frequency of such sending of SR messages) by the server over the same path to know the capability of the client to respond with RR messages to successive SR messages.

For these purposes, the server sends media data on at least one path (and preferably all paths) of the multi-path to ensure client is able to answer to RTCP feedback request (RR messages). Then the server will test iteratively different transmission delays, for instance smaller and smaller, until the client stops responding with RR messages. In other words, a time interval or delay between two feedback request messages to which the client is able to respond with respective feedback messages is obtained, for instance by repetitively sending feedback request messages to the client over a same path with a time interval between two feedback request messages. The time interval to wait before sending a next feedback request message is modified depending on whether or not a response has been received for the next sent feedback request message. The scheduling scheme may thus be determined based on the obtained time interval/delay.

In another embodiment, the time interval delay is exchanged through specific proprietary RTCP messages or in the SDP or any other signaling means As shown in the exemplary Figure, media data and at least two SR messages (reporting transmission of the media data) are transmitted on a path of the multi-path (step 500), such that there is a predetermined delay between the two transmissions. For the first iteration, the transmission delay between two transmissions may be set to an initial value, for instance 5 seconds as recommended by RFC3550.

Then, it is checked (step 501) whether RR messages have been received from the client in response to the SR messages transmitted or not, each RR message being responsive to a given SR message.

If the client responds to the two SR messages with two RR messages, the transmission delay set in step 500 is stored (step 502) in memory, a smaller transmission delay is set (step 503), for instance the transmission delay is decreased by 0.5 s, and another loop is performed with this smaller transmission delay.

Otherwise, if the client does not respond to the SR messages, two situations happen.

If no RR message is received at all, the path used may not be usable by the client, in which case a next path is considered for the process of FIG. 5.

If an RR message is received in response to the first SR message, but no response is obtained for the second SR message, the server records (step 504) the last transmission delay stored at step 502 as being the minimum transmission delay between two SR messages. This delay corresponds to the smallest SR message transmission delay acceptable for the client to properly handle (i.e. respond to) successive SR messages. If it is not respected, the client will not be able to answer all the SR messages.

In a variant, instead of stopping the process, a smaller decrease of the time interval may be tested. For instance, if the client does not respond to the second SR message only, the last transmission delay stored is reduced or decreased by a smaller amount of time, for instance 0.05 s before looping back to step 500.

Figure 4:
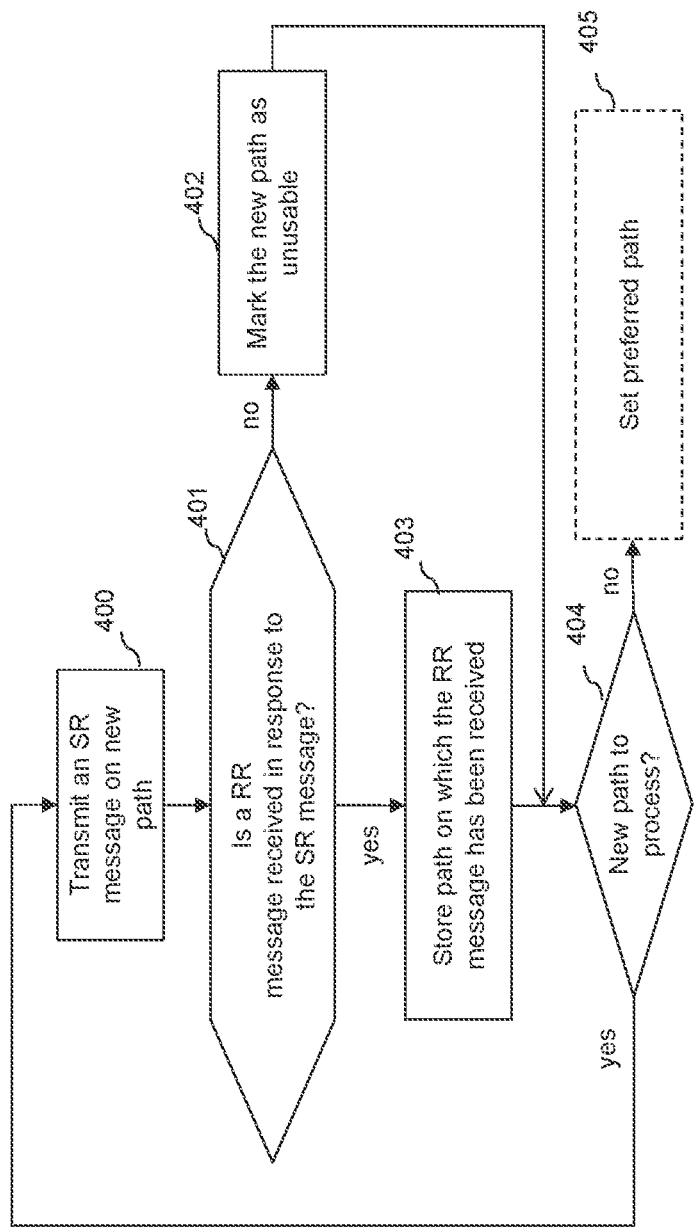
FIGS. 4 and 5 are flowcharts of steps performed during an estimation of client's behavior in embodiments of the method of FIG. 2.

FIG. 4 shows steps for determining usable paths from the client's perspective. In short, usable paths may include the paths used for sending data to which the client responds. Indeed, such a response means that the client actually receives the data sent by the server over this usable path.

This may be done by sending data over each path to consider; determining, for each path, whether a feedback message is received in response to the data sent on this path; and selecting, as usable paths, the paths for which it is determined that a feedback message is received.

In the exemplary process of FIG. 4, while transmitting media data (RTP packets) over one path, the other paths are successively processed.

For instance, an SR message is first transmitted on a given path (step 400). After a predetermined delay, for instance 15 s, the server checks (step 401) if an RR message has been received from the client in response to the SR message over any path of the multi-path.

If no response has been received during this predetermined delay, the server marks, in memory, the path over which the SR message has been transmitted as being unusable (step 402) because the client apparently does not handle data or message coming from this particular path. In the remainder of the process of FIG. 2 described below, the server may thus ignore every path marked as unusable which means that the network conditions of this path are not estimated and no media nor RTCP feedback request are sent on this path.

If the client responds to the SR message within the predetermined delay, the path on which the RR message has been received is stored (step 403) in memory and is associated with the content of this RR message. More generally, the sending path on which the SR message has been sent and the receiving path on which the corresponding RR message has been received are stored in association in memory of the server.

The various associations that are stored at the end may provide helpful information to perform an efficient control phase as described below. This is for instance because the associations make it possible to deduce from a first path, the condition networks of which have already been determines, which next path could be processed to determine its condition networks; In other words, it may be helpful to efficiently build a scheme or pattern that define how the paths are considered to determine the individual condition networks of each paths.

Next to step 403, if there is a new path that has not been processed yet (test 404), the algorithm loops to step 400.

According to embodiments, when all the paths have been processed, a preferred path for the client may be identified (405) based on the results obtained on each path. For instance, when the client has responded to all SR messages by transmitting RR messages on one and a same path, this path is set as the preferred path.

In this case, the monitoring phase 205 as described below may be performed more often for the preferred path compared to the other paths.

It should be noted that if all the processed paths are marked as unusable at step 402, the client does not support RTCP messages in a multi-path context. Thus, the client only supports single path communication. As a consequence, media streaming is performed over a single path (typically a random path or the predetermined path with the highest bandwidth, lowest RTT and the lowest error rate). The RTCP messages are also exchanged on this path only.

Back to FIG. 2, next to step 202, the control phase 203 introduced above is performed. During this control phase, the network conditions of two or more paths, preferably each path of the multi-path are determined.

In order to maximize use of bandwidth, to make it possible to obtain the network conditions of each individual path, and to proceed as quickly as possible, it is useful to successively consider each individual path in a good order. This is because network conditions of a given path may be inferred from network conditions of another path.

The invention thus provides that an order for successively considering each path is determined based on client parameters (such as the minimum interval, the preferred path, the associations between sending and receiving paths, etc.).

To determine the network conditions of a path, data (media data and/or control messages) are sent by the server over at least the path. Thus, at least one feedback message is received, from the client over a reception path (that may be or not the same as the path considered), in response to the sent data. The feedback response messages are thus used to determine the network conditions, possibly using also network conditions already determined for one or more other paths.

Based on the knowledge of the client behavior determined at previous step 202, the server can determine sequentially the network conditions on each path (i.e. on one path after another), as it is described with reference to FIG. 6. This may be done by sending media data (RTP packets) and exchanging control data for instance made of RTCP messages, for instance SR and RR messages reporting the exchange of media data (RTP data). Optionally, the amount of bandwidth used for transmitting the RTP packets may be reduced to ensure a precise estimation of network parameters of each path.

In a variant, the step 202 can be conducted as part of the control phase 203. The server can use the feedback request messages sent during the control phase 203 to progressively learn the behavior of the client. In such a case, the server uses predetermined values and gradually (i.e. dynamically) adapts the pattern or scheme for sending of media data and the feedback request messages as it improves its knowledge of the client's behavior.

Figure 6:
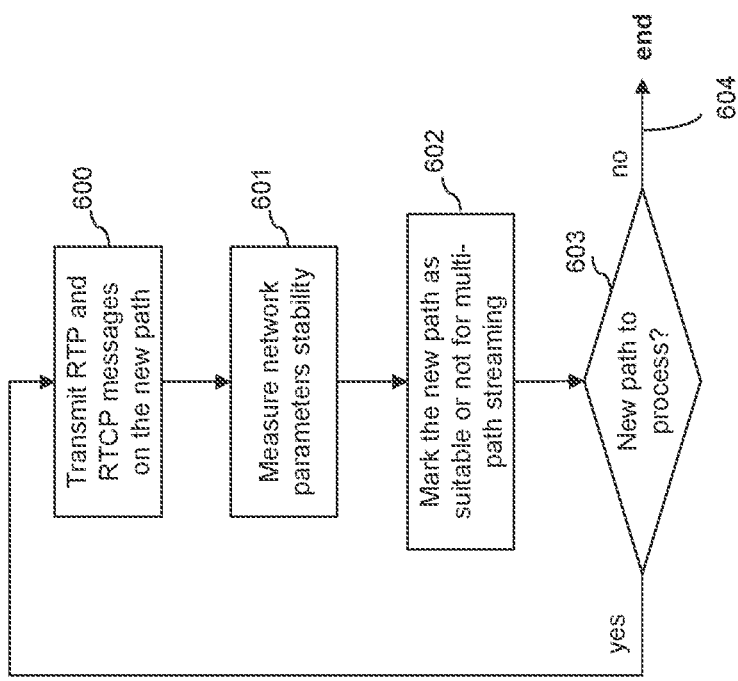
FIG. 6 is a flowchart of steps performed during a control phase in embodiments of the method of FIG. 2.

FIG. 6 shows steps that may be performed during the control phase 203 for determining sequentially the network conditions on each path of the multi-path. Thus, each path determined as usable in the meaning of FIG. 4 is successively considered as shown by the loop between steps 603 and 600. The first considered path is selected depending on the behavior of the client. For instance, if it was determined in step 202 that a preferred path is used by the client, this preferred path is firstly considered. Otherwise the first processed path is randomly selected.

For these purposes, the server transmits media data (RTP packets) and control data (RTCP messages) on a newly considered path, for instance with the minimum transmission delay determined at step 504 between two successive RTCP messages. The server then determines the network conditions based on the feedback messages of the client in response to the RTCP messages from the server.

First, media data and RTCP messages such as SR messages are transmitted by the server to the client on the considered path (step 600). Thanks to the exchanges of the RTCP messages with the client such as SR messages and RR messages, the server is able to infer network conditions for example the RTT, the loss rate, the jitter and the bandwidth of the given path.

As an example, having knowledge of the preferred path, the value of some network parameters may be deduced from the measure of these parameters on another path. For instance, the RTT of the paths other than the preferred path are deduced from the RTT measured on the preferred path, in particular when SR messages from the server and the corresponding RR messages are transmitted on different paths. For instance, the RTT computation may be performed using the algorithm described with reference to FIG. 7.

As the RTT for the preferred path is required to compute the RTTs of the other paths, the knowledge of the preferred path as a parameter characterizing the client can be used to preferably consider the preferred path first, before considering the other paths. This is because the preferred path is autonomous for determining its RTT value as explained below.

Figure 7:
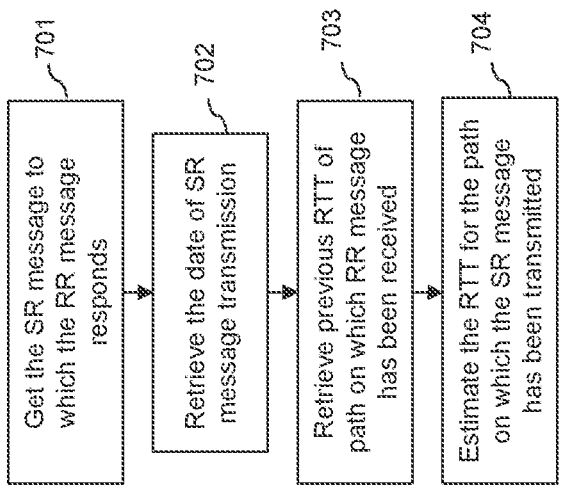
FIG. 7 is a flowchart of steps illustrating an estimation of a RTT value according to embodiments of the present invention.

FIG. 7 shows an inferring process for estimating a RTT value based on the RTT value measured on the preferred path determined as described with reference to FIG. 4.

The RTT of the preferred path may be measured by sending an SR message over this path, receiving an RR message over this same path (this is because the preferred path is identified as the path over which the client responds to the SR messages), and computing a difference between the sending time of the SR and the reception time of the RR minus the Delay Since Last SR (DLSR) value (corresponding to the processing time at the client to process the SR and responds to it).

Next the other paths may be considered. It is assumed that an RR message is received by the server in response to an SR message it has transmitted over one of the other paths. In such a case, upon receiving the RR message, the server retrieves, in the RR message, the last SR timestamp (LSR) value associated with the transmitted SR message (step 701).

The server can then retrieve from its memory the date of transmission of the SR message (step 702). It is here assumed that the SR message has been transmitted on a path (called transmission path) which is different from the preferred path (called reception path) on which the corresponding RR message has been received from the client.

A RTT value denoted RTTm is then estimated based on the date of transmission of the SR message, the date of reception of the RR message, and the Delay Since Last SR (DLSR) value. The calculated RTTm value thus corresponds to the transmission time of SR message over the transmission path plus the transmission time of the RR message over the reception path.

In order to get the RTT value of the transmission path only (denoted RTTt), it is assumed that the RTT of the reception path (denoted RTTr) is almost constant. In this example, it is equal to the RTT value of the preferred path computed as described above.

In one embodiment the latest RTT value of the reception path is retrieved as the RTTr value (step 703).

As an alternative, the mean of previous RTT values of the reception path may be used as the RTTr value.

Based on the hypothesis that the RTT value is equally divided between the two directions (transmission and reception), an estimation of the RTTt value is computed (704) using this following formula:

$$RTTt=2\times RTTm-RTTr$$

For instance, when the server has determined that the client uses a preferred path for transmitting its RTCP messages, the RTT of the paths other than the preferred path are deduced from the RTT measured on the preferred path, in particular when SR messages from the server and the corresponding RR messages are transmitted on different paths.

Back to FIG. 6, network conditions are determined during few seconds (i.e. a plurality of feedback messages are exchanged and a plurality of sets of network conditions are determined) and stored in memory in order to check (step 601) if they are stable enough over time to ensure that the path considered can be used during the multi-path streaming. This is because if the network conditions change very rapidly, the path cannot be monitored efficiently using only feedback messages from the client as in step 205 described below.

In other words, during these few seconds, a plurality of feedback response messages are received over the reception path for the path currently considered. In such a case, determining network conditions may comprise:

estimating, for each received feedback response message, a set of network conditions of the considered path; and
  determining network stability of the considered path based on a variation of its network conditions over the estimated sets.

In practice, if the difference between the sets of measures is less than a predetermined value, for instance 10% (e.g. 10% of RTT value), the obtained network conditions are considered as being stable. In this case, the path considered is marked as suitable for the streaming (step 602). This path may be selected at the end of the control phase 203 for the transmission step 204.

Otherwise, if the obtained network conditions are not stable, the path considered is marked (step 602) as not sufficiently stable (i.e. not suitable) for the multi-path streaming and it is thus disabled from multi-path streaming. This path cannot be selected at the end of the control phase 203 for the transmission step 204.

Then, if there is a new path that has not been processed yet (test 603), the algorithm loops to step 600. When there is no more path to be processed, meaning that all the paths have been processed, the process ends (step 604).

In the case where none of the paths is determined as stable enough for multi-path transmission, multi-path transmission cannot be performed and a single path is selected for the streaming. It may be a predetermined default path or, as an alternative, the path with the highest bandwidth and the lowest loss rate.

In this exemplary embodiment, the data (media data and/or control messages) are transmitted only over the path currently considered, as shown in FIG. 3a.

According to a variant, at step 600, RTCP and RTP messages are transmitted over the path newly considered and, in addition, RTP messages (i.e. media data) are also transmitted simultaneously over one or more other paths already processed and marked as suitable for the multi-path streaming, if any. In other words, the data are sent over the path considered and at least one path already determined as being stable.

This variant is shown in FIG. 3b. This is to reduce the impact of the control phase on the streaming. Indeed, media data can be sent simultaneously to the control phase.

To efficiently take advantage of the path or paths already processed to send media data (e.g. to use all the bandwidth available), it is important to already know the network conditions of these paths. This is why it is sought to determine a relevant scheme or pattern defining how the paths are successively considered, in order to ensure the network conditions of a path currently considered do not depend on network conditions of path not yet processed.

In the example of FIG. 3b, RTP and RTCP messages 303 are exchanged on a first path, e.g. the preferred path, for determining the network conditions on this first path, and as soon as they are determined, RTP messages 304 are transmitted on this first path while other RTP and RTCP messages 305 are exchanged on a second path for determining the network conditions on this second path. As soon as they are determined, RTP messages 306 are transmitted on this second path (RTP messages being still transmitted on the first path) while RTP and RTCP messages 307 are exchanged on a third path for determining the network conditions on this third path. As soon as they are determined, streaming data 308 are transmitted on this third path. Thus, in this example, the transmission of RTP messages (304, 306, 308) becomes progressively multi-path.

In the two examples shown in FIGS. 3a and 3b, given for illustrative purposes only, it is assumed that the network conditions determined during the control phase (301, 303, 305, 307) are such that all the controlled paths (here all three) are suitable for multi-path transmission of data.

The present invention is not limited thereto. For example, some of the controlled path may not be suitable to the multi-path transmission of data, for example due to unstable network conditions. In embodiments, there may be only two paths or more than three paths.

The RTP messages in steps 303, 305 and 307 are media data of the stream sent during step 204 described below (multi-path communication).

In variant, the RTP messages in steps 303, 305 and 307 are dummy or test packets not related to the stream sent during step 204.

In the variant of FIG. 3b, network conditions for second path (respectively third path) must be obtained by difference with the values of the network conditions stored for the previously processed first path (respectively first and second paths). For instance, the bandwidth of the current path is computed as the difference or proportionally between the bandwidth provided by the RTCP messages and the sum of the bandwidths obtained for each other path already processed. For the packet loss rate, the number of RTP packets sent on the previously processed first path is compared to the number of packets sent on the second path in order to infer the loss rate of the second path in function of the loss rate specified in the RTCP feedback which the loss rate among packets received from all paths.

The advantage of this variant is that the available bandwidth to transmit the media stream (RTP messages) increases progressively and the perceived quality at client side is improved.

Once all the paths have been processed, the control phase has provided a precise per-path estimation of the network conditions at least on each of the suitable paths. All the average values of network conditions determined during this control phase are stored in memory for each suitable path and are used to perform transmission 204 as described below.

Back to FIG. 2, next to step 203, step 204 comprises a multi-path communication during which data are exchanged. The exchange of data (media data and control messages) is made according to a scheduling scheme, thus defining which data are sent on which path with which timing. The scheduling scheme is determined based on the network conditions estimated above, in order to perform the best exchange of data as possible. Of course, the client parameters are also taken into account, for instance to avoid transmitting over unusable paths or to adopt an appropriate timing of sending feedback request messages given the minimum interval time computed for the client.

Step 204 may include selecting, based on the network conditions determined at step 203 for the paths, two or more suitable paths on which the RTP packets (e.g. comprising media data) may be transmitted and/or at least one path on which RTCP messages (comprising control data) may be preferably exchanged with the client.

During step 204, the amount of media data and of RTCP messages to be sent on each of the selected paths is also determined to optimize data streaming and feedback messages from the client.

In practice, this selection aims at balancing the transmission of the media packets (RTP packets) over two or more suitable paths such that the usage of bandwidth is maximized. The selection of the path(s) for transmitting RTCP messages to the client also aims at efficiently sending the RTCP messages over the path so that the reception by the client is optimal, for instance given the minimum interval time that must be respected between two sending of RR messages.

It ensures a reliable estimation of the network conditions (streaming conditions) of each path to be obtained based on RTCP feedback messages received from the client.

Concerning media data (RTP packets), an objective is to encode (or to select a pre-stored file) them with the highest possible quality and thus the highest possible bitrate, given that the higher is the bandwidth provided by the network paths (i.e. the sum of the bandwidths of each path), the higher the quality perceived at the client will be. Thus, the selection may be based on a set of constraints on bandwidth and loss rate stability to be verified by the selected paths. The paths which network conditions are determined during the control phase but that do not verify these constraints are not selected, meaning that they will not be used for transmitting RTP packets in the next step.

Concerning control data (RTCP packets), these particular data must comply with certain constraints too. As already mentioned, delivery requirements (transmission requirements) are different depending on the type of packets or messages exchanged. The path(s) for transmitting the different RTCP messages are thus selected based on the specific requirements due to the type of RTCP messages to be transmitted, and the network conditions determined on the paths.

In practice, the transmission of RTP packets is scheduled to ensure a delivery on time to the client depending on the RTT on each path, determined during the control phase as part of the network conditions.

In the example shown in FIG. 3a, the multi-path communication 302 occurs after the end of the control phase 301, i.e. after the network conditions of all the paths have been determined.

In contrast, in the example shown in FIG. 3b, as soon as satisfactory network conditions have been determined for one path (e.g. the first path), the multi-path transmission may start over this path in addition to the next path to process (e.g. second path). Thus, in this example, the transmission of streaming data (304, 306, 308) becomes progressively multi-path.

Next to or during multi-path transmission step 204, a monitoring phase 205 is performed in order to monitor the network conditions of the multi-path.

During this monitoring phase 205, RTCP messages are sent over each considered path marked as suitable, for instance based on the obtained frequency, in order to obtain feedback reports from the client, about sent RTP messages. For illustrative purposes only, if a minimal time interval (corresponding to frequency) of 5 seconds is obtained when two paths are used for multi-path transmission, an RTCP message can be sent on each path each 10 seconds.

These feedback reports are analyzed in order to evaluate possible changes in network conditions.

For instance, the monitoring phase 205 may include:
based on any feedback message received in response to the transmitted data, estimating new network conditions of the paths; and
comparing, for at least one path, its new network conditions to its network conditions determined at step 203.

Thus, the monitoring phase aims at coarsely estimating network conditions on paths based on feedback messages transmitted by the client on these paths, in order to identify quickly changes in network conditions (step 206) by comparison to the network conditions determined during the control phase 203, while maximizing the bandwidth use for transmitting the media data (RTP messages).

Decisions may be taken based on the comparison. In particular, if a variation between the new network conditions and the determined network conditions of one path exceeds a predefined threshold, the network conditions of at least this path (possible of all the paths) can be determined anew with a new control phase 203. Preferably the new control phase 203 determines new network conditions for all the paths.

For example, if the estimated network conditions are within a predetermined interval around network conditions determined during the control phase 203 (for instance +/−20%), it is considered that the network conditions are still stable enough to continue the multi-path streaming according to the current scheduling scheme. Otherwise, the network conditions are no longer stable, at least for this path, in which case the new control phase 203 is performed. Of course, whether the new control phase 203 should be performed anew can be determined only after the network conditions for all the used paths are estimated and the network stability thereof are also determined. In this situation, the used paths with network instability are known, which may be helpful to reduce the new control phase to them only.

During the monitoring phase, the RTT and the loss rate are preferably monitored since a variation of these parameters is known to indicate network congestion when increasing.

As another example, a change in network conditions may be detected when a number of received Negative Acknowledgment message transmitted by the client exceeds a predetermined threshold.

The coarse estimation of network conditions may comprise determining the transmission delay (or transmission frequency) between two SR messages assuming that for lowest delays the estimation accuracy of network conditions is maximized and on the contrary for highest delays, the estimation is less precise. Thus, a transmission delay equal to the minimal transmission delay estimated at step 504 as described with reference to FIG. 5 may be used.

In another embodiment, the transmission delay used between two SR messages transmitted by the server is progressively increased when the path is determined to be stable for a long time period. In other words, if the variations for all the two or more paths do not exceed the predefined threshold for at least a predefined duration, increasing a time interval between the sending of two feedback request messages by the server. This allows sending fewer feedback request messages in case of stable paths so that more media data are transmitted and/or more RTCP messages are sent over other less stable paths in order to improve their monitoring.

For instance, if for the last 10 measures, the network conditions have not changed, the transmission delay is increased of a predetermined value (for instance 20%). As soon as the network conditions change, i.e. when a variation between the new network conditions and the determined network conditions of one path exceeds a predefined threshold, the transmission delay is estimated again during a new control phase.

In one embodiment, only paths detected as unstable during the monitoring phase 205 are processed again during a new control phase 203.

In another embodiment, when the client transmits feedback messages on a preferred path determined as described with reference to FIG. 4, the server may send feedback request messages over the preferred path more often than over another path. Since, upon receiving each feedback response message in response to the sent feedback request messages, the server estimates new network conditions of the preferred path based on the received feedback response message, the server estimates more often the network conditions of the preferred path. The preferred path is thus more monitored.

For instance, the server estimates the RTT value of this preferred path more regularly than for another path, the objective being to maximize the precision of the RTT estimation process as described with reference to FIG. 7. This is because the RTT values (or the values of any network condition) of the other paths may be estimated based on the RTT value of the preferred path.

In this case, a predetermined maximum transmission delay between two transmissions of SR messages on the preferred path is defined, for instance 15 s.

The server is thus able to maximize the RTP session bitrate and the load balancing of packets over the different paths is adapted according to the network conditions even if the client does not fully support MP-RTP feature.

The process ends when the streaming ends.

Figure 8:
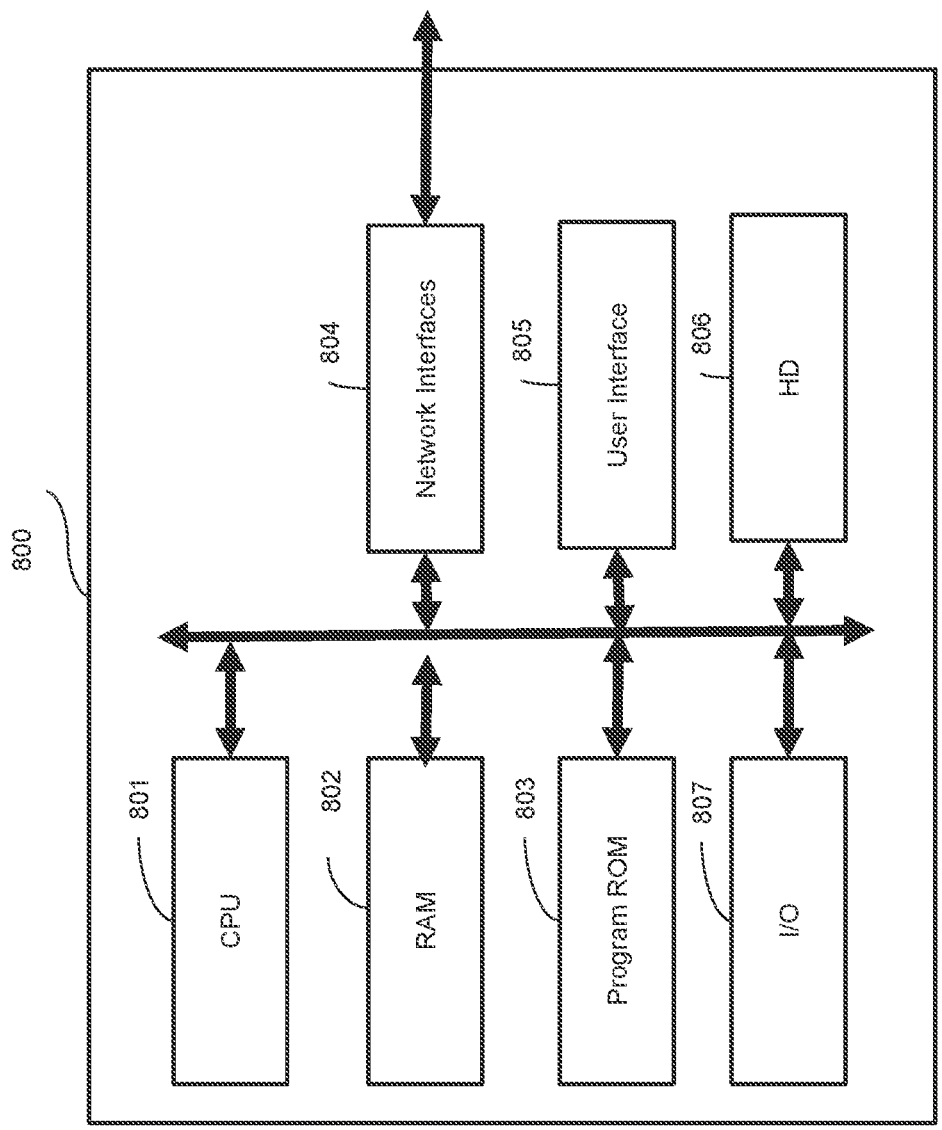
FIG. 8 schematically illustrates a possible architecture of a server according to embodiments of the present invention.

FIG. 8 is a schematic block diagram of a server 800 for implementing one or more embodiments of the invention. The device 800 comprises a communication bus connected to:

- A central processing unit 801, such as a microprocessor, denoted CPU;
- A random access memory 802, denoted RAM, for storing the executable code of the method of embodiments of the invention as well as the registers adapted to record variables and parameters necessary for implementing a method according to embodiments, the memory capacity thereof can be expanded by an optional RAM connected to an expansion port for example;
- A read only memory 803, denoted ROM, for storing computer programs for implementing embodiments of the invention;
- Network interfaces 804 typically connected to a communication network over which digital data to be processed are transmitted or received. Data are written to the network communication interfaces for transmission or are read from the network communication interfaces for reception under the control of the software application running in the CPU 801;
- An optional user interface 805 for receiving inputs from a user or to display information to a user;
- A hard disk 806 denoted HD;
- An I/O module 807 for receiving/transmitting data from/to external devices such as a video source or display;

The executable code may be stored either in read only memory 803, on the hard disk 806 or on a removable digital medium such as for example a disk. According to a variant, the executable code of the programs can be received by means of a communication network, via the network communication interfaces 804, in order to be stored in one of the storage means of the communication device 800, such as the hard disk 806, before being executed.

The central processing unit 801 is adapted to control and direct the execution of the instructions or portions of software code of the program or programs according to embodiments of the invention, which instructions are stored in one of the aforementioned storage means. After powering on, the CPU 801 is capable of executing instructions from main RAM memory 802 relating to a software application after those instructions have been loaded from the program ROM 803 or the hard-disc (HD) 806 for example. Such a software application, when executed by the CPU 801, causes the steps of a method according to embodiments to be performed.

Although the present invention has been described hereinabove with reference to specific embodiments, the present invention is not limited to the specific embodiments, and modifications which lie within the scope of the present invention will be apparent to a person skilled in the art. Many further modifications and variations will suggest themselves to those versed in the art upon making reference to the foregoing illustrative embodiments, which are given by way of example only and which are not intended to limit the scope of the invention as determined by the appended claims. In particular different features from different embodiments may be interchanged, where appropriate.

The invention claimed is:

1. A method of estimating network conditions of a multipath connection between a server and a client not aware of multi-path signaling, the server having a plurality of communication interfaces connected to a same communication interface of the client through a respective plurality of paths, the method comprising, at the server:
    obtaining at least one parameter characterizing the client;
    determining, based on the at least one obtained parameter, an order for successively considering each path of two or more paths;
    for each path successively considered, sending data over at least the path considered, and receiving, over a reception path, at least one feedback message, in response to the sent data; and
    determining network conditions of the two or more paths, using the received feedback messages.

2. The method according to claim 1, wherein network conditions of a given path are inferred from network conditions of another path.

3. The method according to claim 1, wherein network conditions of the considered path are determined based only on the feedback messages received in response to data sent over the considered path or determined network conditions of at least one already considered path.

4. The method according to claim 1, wherein a plurality of feedback response messages are received over the reception path for the considered path, and determining network conditions comprises:
estimating, for each received feedback response message, a set of network conditions of the considered path; and
determining network stability of the considered path based on a variation of its network conditions over the estimated sets.

5. The method according to claim 4, further comprising disabling, from use for multi-path transmission of data, a path determined as unstable.

6. The method according to claim 4, wherein the data are sent over the path considered and at least one path already determined as being stable or the data are sent over the path considered only.

7. The method according to claim 1, wherein the at least one parameter characterizing the client comprises a time interval between two feedback request messages to which the client is able to respond with respective feedback messages.

8. The method according to claim 7, wherein the time interval is obtained by repetitively sending feedback request messages to the client over a same path with a time interval between two feedback request messages that varies depending on whether a feedback message is received from the client in response to the sent feedback request message or not.

9. The method according to claim 1, wherein obtaining the least one parameter characterizing the client comprises selecting the two or more paths from among the plurality of paths, wherein the selecting step comprises:
sending data over each path of the plurality;
determining, for each path, whether a feedback message is received in response to the data sent on this path; and
selecting the paths for which it is determined that a feedback message is received.

10. The method according to claim 9, further comprising determining a single path, referred to as preferred path, over which all the feedback response messages are received.

11. The method according to claim 10, wherein a Round Trip Time value on a given path is inferred from a Round Trip Time value of the preferred path.

12. The method according to claim 1, wherein obtaining the least one parameter characterizing the client comprises:
sending data over a sending path;
receiving, over a receiving path, at least one feedback message, in response to the sent data;
associating in memory the sending path with the receiving path.

13. The method according to claim 1, wherein the network conditions of a given path comprise at least one of the following parameters: bandwidth available on the given path, Round Trip Time value on the given path, jitter on the given path and loss rate on the given path.

14. The method according to claim 1, wherein the two or more paths comprise the plurality of paths.

15. A method of transmitting data over a multi-path connection between a server and a client not aware of multi-path signaling, the server having a plurality of communication interfaces connected to a same communication interface of the client through a respective plurality of paths, the method comprising, at the server:
estimating network conditions of two or more paths by:
obtaining at least one parameter characterizing the client;
determining, based on the at least one obtained parameter, an order for successively considering each path of two or more paths;
for each path successively considered, sending data over at least the path considered, and receiving, over a reception path, at least one feedback message, in response to the sent data; and
determining network conditions of the two or more paths, using the received feedback messages;
determining, based on the estimated network conditions, a scheduling scheme for transmitting data over the two or more paths; and
transmitting, according to the scheduling scheme, data over the two or more paths.

16. The method according to claim 15, further comprising a monitoring step comprising:
based on any feedback message received in response to the transmitted data, estimating new network conditions of the two or more paths; and
comparing, for at least one path, its new network conditions to its determined network conditions.

17. The method according to claim 16, further comprising, if a variation between the new network conditions and the determined network conditions of one path exceeds a predefined threshold, estimating new network conditions of at least the path.

18. The method according to claim 17, further comprising, if the variations for all the two or more paths do not exceed the predefined threshold for at least a predefined duration, increasing a time interval between the sending of two feedback request messages by the server.

19. The method according to claim 16, wherein the monitoring step comprises sending feedback request messages over a preferred path more often than over another path, and upon receiving each feedback response message in response to the sent feedback request messages, estimating new network conditions of the preferred path based on the received feedback response message.

20. A server comprising:
a plurality of communication interfaces to establish a multi-path communication over a respective plurality of paths, with a same communication interface of a client not aware of multi-path signaling;
at least one microprocessor configured for carrying out, in a web runtime environment running in the server, executing the following steps:
obtaining at least one parameter characterizing the client;
determining, based on the at least one obtained parameter, an order for successively considering each path of two or more paths;
for each path successively considered, sending data over at least the path considered, and receiving, over a reception path, at least one feedback message, in response to the sent data; and
determining network conditions of the two or more paths, using the received feedback messages.

* * * * *